United States Patent [19]

Oura

[11] 4,318,097
[45] Mar. 2, 1982

[54] DISPLAY APPARATUS FOR DISPLAYING A PATTERN HAVING A SLANT PORTION

[75] Inventor: Toshio Oura, Tokyo, Japan

[73] Assignee: Nippon Electric Co., Ltd., Tokyo, Japan

[21] Appl. No.: 20,789

[22] Filed: Mar. 15, 1979

[30] Foreign Application Priority Data

Mar. 15, 1978 [JP] Japan .................................. 53-30202

[51] Int. Cl.³ .............................................. G09G 1/14
[52] U.S. Cl. ..................................... 340/728; 340/747
[58] Field of Search ........................ 340/747, 722, 728

[56] References Cited

U.S. PATENT DOCUMENTS 3,680,076 7/1972 Duffek et al. ........................ 340/728
3,812,491 5/1974 Barraclough et al. ............... 340/747
3,894,292 7/1975 Wilkinson ........................... 340/747
4,095,216 6/1978 Spicer ................................. 340/728

Primary Examiner—Marshall M. Curtis
Attorney, Agent, or Firm—Sughrue, Mion, Zinn, Macpeak and Seas

[57] ABSTRACT

A pattern display apparatus in which a pattern is composed of a plurality of rectangular picture elements; picture element signals representing the picture elements are generated from a pattern generator in synchronism with a scanning type display means, and the picture element signals are applied to the scanning type display means thereby to display the pattern thereat comprises means for selectively converting the picture element at a slant portion of the pattern into substantial parallelogram picture element with such slope as to run along the slant line of the slant portion.

10 Claims, 13 Drawing Figures

FIG.6a
| 0 | 0 | 0 | 0 | 0 | 1 | 0 |
|---|---|---|---|---|---|---|
| 0 | 0 | 0 | 0 | 1 | 0 | 0 |
| 0 | 0 | 0 | 1 | 0 | 0 | 1 |
| 1 | 1 | 1 | 1 | 1 | 1 | 1 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
FIG.6b
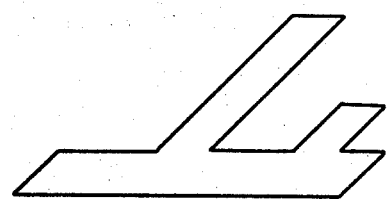
FIG.6c
| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 1 | 0 | 0 | 1 |
| 0 | 0 | 0 | 0 | 1 | 0 | 0 |
| 0 | 0 | 0 | 0 | 0 | 1 | 0 |
FIG.6d
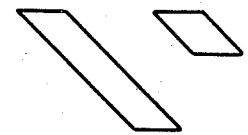
FIG.6e
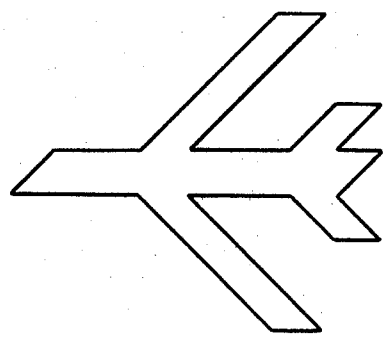

4,318,097

DISPLAY APPARATUS FOR DISPLAYING A PATTERN HAVING A SLANT PORTION

FIELD OF THE INVENTION

The invention relates to a pattern display system for displaying patterns on the screen of a cathode ray tube such as used in a television set.

One of known pattern display systems of this kind is a display system for a video game apparatus in which some patterns such as characters, figures, symbols or the like are displayed on a scanning type of display unit such as a television set, for the purpose of playing a game. In this type of display system, a pattern is synthesized by properly combining rectangular or square picture elements. One picture element with such a configuration corresponds to one bit of the pattern information stored in a memory. In other words, one bit of the stored pattern information visualizes a square dot. In displaying a pattern including oblique or slant portions, such as jet planes and ships, unless the picture elements used are very small in size, the pattern displayed is unnatural and out of shape in configuration, being different from the actual pattern.

SUMMARY OF THE INVENTION

Accordingly, an object of the invention is to provide a pattern display system which can display real and natural patterns without making the size of picture element shall and thus without increasing the memory capacity, and without requiring high speed for data transfer.

According to this invention, there is provided a pattern display system comprising: memory means for storing pattern information representing a plurality of rectangular picture elements of a pattern to be displayed; means for generating scanning signals; scanning type display means which operates in synchronism with the scanning signal; means for generating a display signal from the memory means in synchronism with the scanning signal; means for recognizing a slant portion of the pattern; and means for converting the square picture elements into substantially parallelogram picture elements in response to the output signal derived from the recogniging means.

According to this invention, there is also provided a pattern display system in which a pattern is decomposed into a plurality of rectangular picture elements, picture element signals representing the decomposed picture elements are generated from a pattern generator in synchronism with a scanning type display unit, and the picture element signals are applied to the scanning type display unit to thereby display the pattern thereat, comprising means for converting the picture elements of a slant portion of the pattern into substantially parallelogram picture elements with such slopes as to run along the slant line of the slant portion.

According to this invention, there is also provided a pattern display apparatus comprising a plurality of read-only memory locations, each of the read-only memory locations storing a pattern composed of a plurality of rectangular picture elements, scanning type display unit, and means for generating picture element signals in synchronism with the display unit from a selected memory location, wherein the generating means includes means for recognizing an address of the selected memory location and means responsive to the address information from the recognition means for selectively converting the picture element signal representing the rectangular picture element into a parallelogram picture element signal which displays a substantially parallelogram picture element on the display unit.

Other objects and features of the invention will be apparent from the following description taken in connection with the accompanying drawings, in which:

BRIEF DESCRIPTION OF THE DRAWINGS

FIG. 6(a) shows a bit pattern of a display pattern stored in a memory;

FIG. 6(b) shows a display pattern corresponding to the bit pattern shown in FIG. 6(a);

FIG. 6(c) shows a bit pattern of another display pattern stored in a memory;

FIG. 6(d) shows a display pattern corresponding to the bit pattern shown in FIG. 6(c);

FIG. 6(e) shows a display pattern which is a combination of the display patterns shown in FIGS. 6(a) and (c)

DESCRIPTION OF THE PREFERRED EMBODIMENTS

Figure 1A:
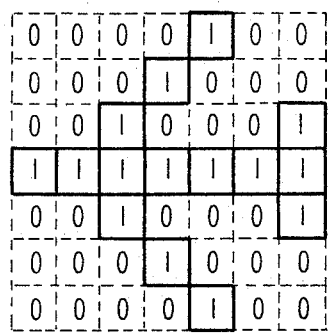
FIG. 1(a) shows a bit pattern of a pattern to be displayed, which is stored in a memory.
Figure 1B:
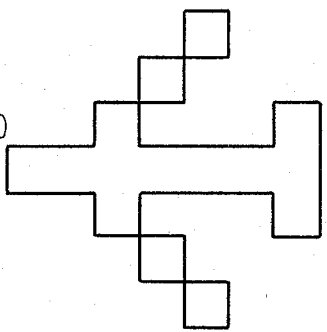
FIG. 1(b) shows an example of a pattern displayed by a conventional pattern display system.

Reference is made to FIG. 1 illustrating an example of a display pattern displayed by a conventional pattern display system. In FIG. 1(a), there is shown a bit pattern of a jet plane, which is stored in a read-only memory, and in this display system one bit in the read-only memory corresponds to one dot in a display. The vertical length of one dot is scanned by four scanning lines per one field. FIG. 1(b) shows a display pattern, which corresponds to the bit pattern shown in FIG. 1(a), displayed on a television screen. The elementary rectangular portions representing "1" in the bit pattern in FIG. 1(a) correspond to bright portions on the television screen while the elementary rectangular portions representing "0" correspond to non-bright portions. As seen from FIG. 1(b), the slanted portions such as the wing and empennage of the plane are discontinuous and out of shape, thus taking an unnatural shape different from the real shape of the airplane. The use of picture elements of which the horizontal and vertical lengths are reduced to be ¼ as long as those of the picture element shown in FIG. 1(b), which the picture elements are stored in extra memory locations, solves the just-mentioned disadvantage and provides a natural and real configuration of an object to be displayed. This method, however, requires 16 (4×4) times the memory capacity and four times the data transfer speed. In the integrated circuit fabrication of the video game apparatus or the like, these requirements are problematic in the memory capacity and processing speeds.

Figure 2:
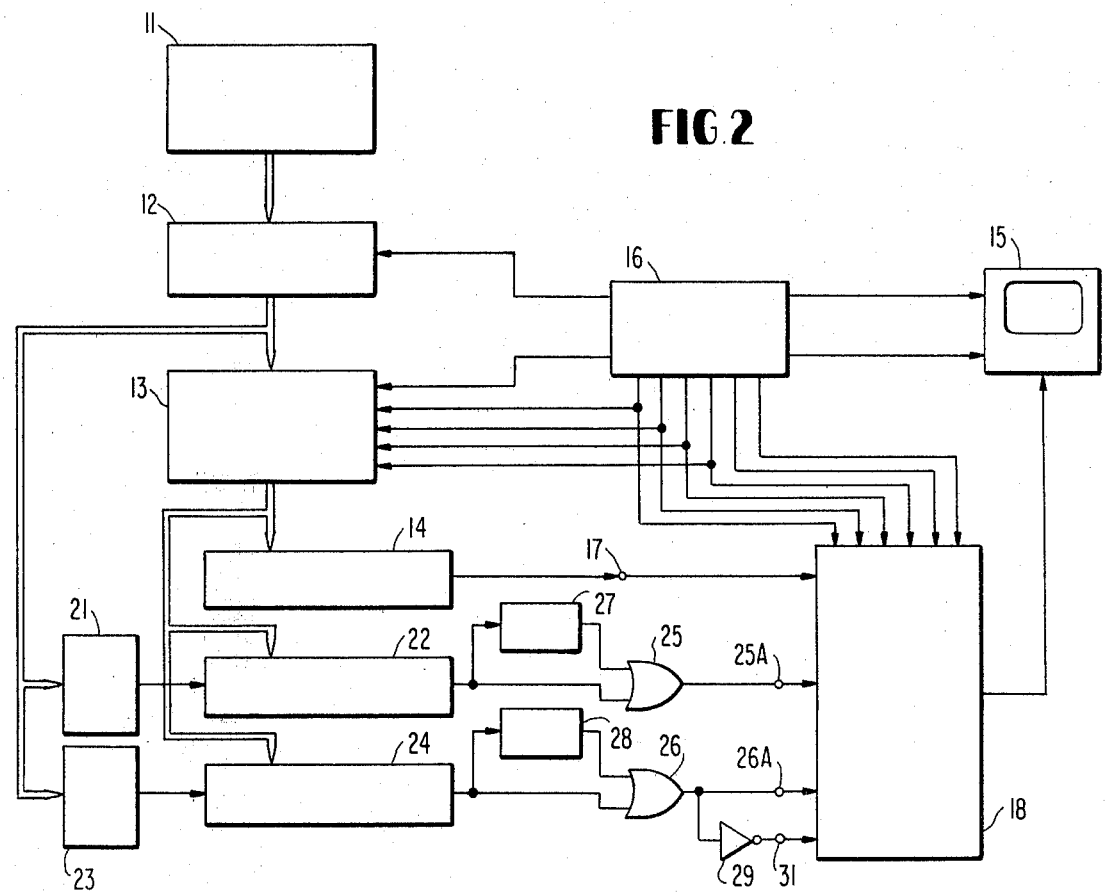
FIG. 2 shows a block diagram of an example of a pattern display system according to the invention.

Turning now to FIG. 2, there is shown an embodiment of a pattern display system according to this invention. A character signal generator 11 includes a plurality of units of read-only memory matrix locations, each of which stores a pattern to be displayed for example as shown in FIG. 1(a). This character signal generator 11 generates character signals corresponding to characters, figures or symbols and sets the character signals on one picture element line to be displayed to a character register 12. A character register 12 stores bit information on one line of the pattern and address information relating to a read-only memory matrix location from which a pattern to be displayed is generated.

Upon the character signals transferred from the character register 12, a character pattern generator 13 generates picture element signals representative of picture elements. In connection with the picture elements, patterns such as characters, figures and symbols are decomposed into picture elements; 7×7 picture elements, for example, for each character.

More specifically, the pattern generator 13 first successively generates 7 bits of picture element signals on the first line, which represent a train of picture elements of each character, and then those bits of signals are loaded into a picture element pattern shift register 14. A read-only memory is generally used for the character pattern generator 13. Picture elements on each picture element line are read out four times in synchronism with the scanning of a scanning type display unit 15, for example, a television set. For this synchronization, a timing circuit 16 supplies vertical and horizontal synchronizing signals to the display unit 15 to drive it and the output signal from the timing circuit 16 also controls the reading operation of the character pattern generator 13. The picture element signal read out through an output terminal of the shift register 14 is supplied through a picture element converting circuit 18 to the display unit 15.

The picture elements on the slant portions of the pattern are converted into parallelogram picture elements and those on the vertical and horizontal portions of the pattern are not subjected to such a conversion. In this way, some picture elements are converted in their shapes while some are not converted. Some of the picture elements so converted form parallelograms slanting upwardly to the right and the remaining ones form parallelograms slanting downwardly to the right. Those respective types of parallelograms must be distinctively treated. For distinguishing one from another, different read-only memory locations, that is, memory location addresses, are used for the picture elements to be converted and for those not converted. Further, different memory locations are allotted to the right upward parallelograms and to the right downward parallelograms. Accordingly, the address specified of the memory location determines whether the picture element stored therein is to be converted or not, if so, whether it takes the right upward shape or the right downward shape.

For example, an address signal transferred from the character register 12 to the character pattern generator 13 is decoded by a decoder 21. The output signal of the decoder 21, in the case of the converting picture element, causes the output signal of the pattern generator 13 to go into a slant pattern register 22, at the same time that the same output is loaded into the character pattern register 14. The address signal from the character pattern register 12 is decoded by a decoder 23 and the decoded signal from the decoder causes the character pattern generator 13 to produce an output signal which in turn is set in a direction register 24, in the case where the picture element to be converted is of the right upward type.

Figure 3A:
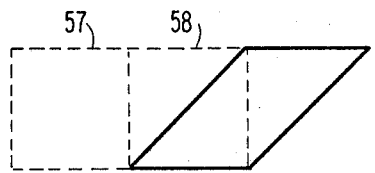
FIGS. 3(a) and (b) show examples of parallelogram picture elements used in the pattern display system according to the invention.

As seen from FIG. 3(a), one parallelogram picture element extends over two rectangular picture elements. To treat such an extended picture element, the output signals of registers 22 and 24 are applied directly to one of the inputs of OR gates 25 and 26. Through circuits 27 and 28, each of which provides one picture element delay, the signal is applied to the other inputs of the same gates. The output signal of the OR gate 25 is applied as a picture element converting command to the picture element converting circuit 18, by way of an output terminal 25A. The output signal of the OR gate 26 is applied as a right upward command to the converting circuit 18, via a terminal 26A, and is applied as a right downward command to the converting circuit 18, via an inverter 29 and a terminal 31.

Figure 4:
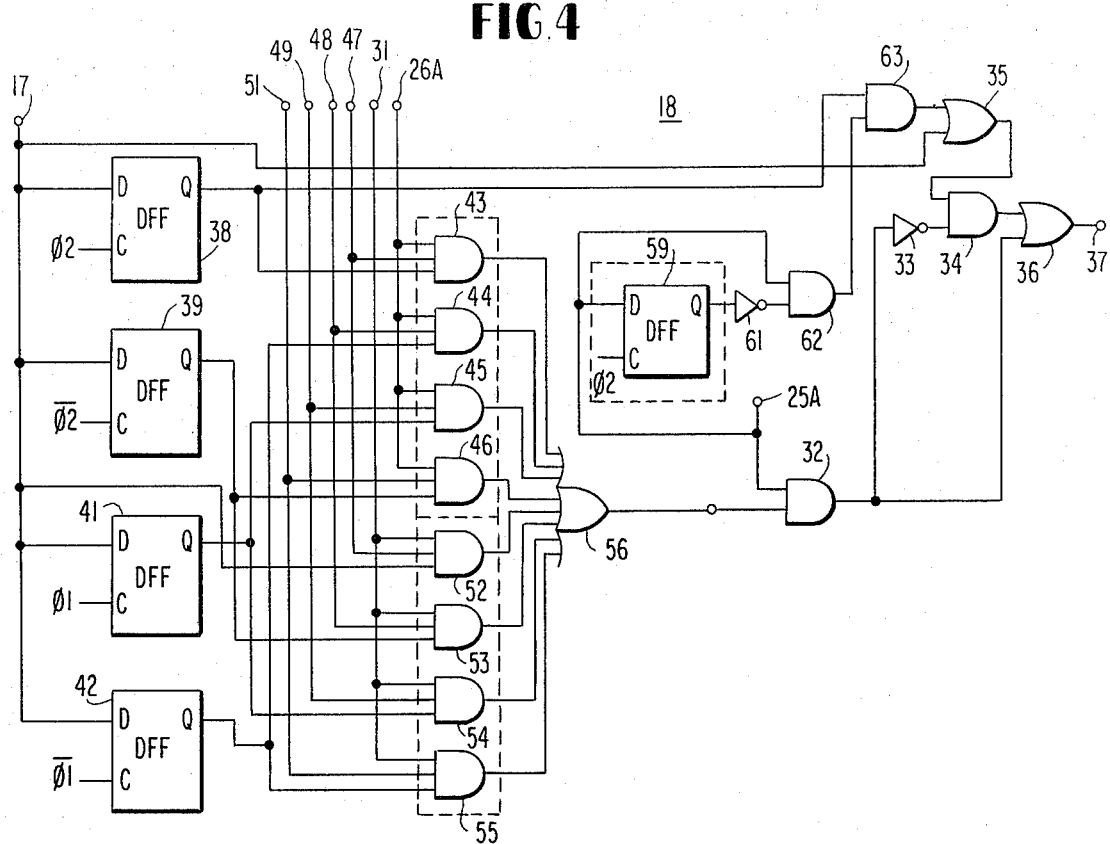
FIG. 4 shows a circuit diagram of a picture element converting circuit which is essential to the invention.

Referring now to FIG. 4, there is shown an example of the picture element converting circuit 18. When the output signal of the slant pattern register 24 to be applied to the terminal 25A is at low level, the output of an AND gate 32 also is at low level. The output signal of the AND gate 32 is inverted by an inverter 33, thereby to enable an AND gate 34. The output signal of the character pattern register 14 coming in through a terminal 17, that is, a picture element signal, passes through an OR gate 35, the AND gate 34 and an OR gate 36 to reach an output terminal 37 from which it is outputted as an output signal of the converting circuit 18 to the display unit 15. (FIG. 2). The output signal of the converting circuit 18 is used to effect an intensity modulation of a cathode ray tube, for example, of the display unit 15. The operation just mentioned relates to a case where no conversion of the picture element is performed.

Figure 5:
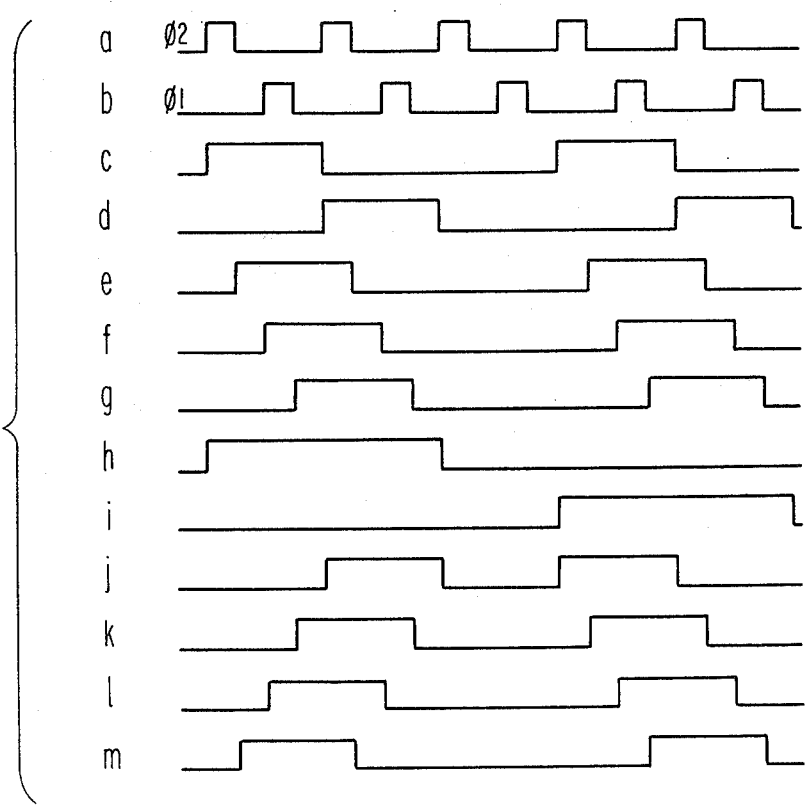
FIG. 5 shows a set of waveforms useful in explaining the operation of the picture element converting circuit.

In case where the picture element is converted, the picture element signal derived from the terminal 17 is delayed by delay circuits 38, 39, 41 and 42 to be delayed signals separated with time intervals each of $\frac{1}{4}$ period for one picture element. Those delay circuits may be made up of D-type flip-flops. Those flip-flops 38, 39, 41 and 42 receive at the data terminals D the picture element signal coming from the terminal 17. As shown in FIG. 5(a) and 5(b), a clock signal $\phi_2$ synchronized with the picture element signal and a clock signal $\phi_1$ which is phase-shifted by a half-period with respect to the clock signal $\phi_2$ are produced by the timing circuit 16. The pulse width of each of those clock pulses $\phi_1$ and $\phi_2$ is selected to be $\frac{1}{4}$ of the period.

The clock signal $\phi_2$ is applied to the clock terminal C of the flip-flop 38. When a picture element signal as shown in FIG. 5(c) appears at the input terminal 17, the flip-flop 38 which receives the clock signal $\phi_2$ slightly earlier than the picture element signal, produces a signal delayed by one picture element period behind the picture element signal, as shown in FIG. 5(d). The inverted signal of the clock signal $\phi_2$ is applied to the clock terminal of the flip-flop 39. At the trailing edge of the clock signal $\phi_2$, the data input is taken from the flip-flop 39, in the waveform which is delayed by $\frac{1}{4}$ picture element period, as shown in FIG. 5(e). To the clock terminal of flip-flop 41 is applied the clock signal $\phi_1$. As a result, the flip-flop 47 produces at the output terminal a signal which lags by $\frac{1}{2}$ picture element period behind the input signal, as shown in FIG. 5(f). Similarly, the inverted signal of the clock signal φ1 is applied to the clock terminal of the flip-flop 42 so that it produces an output signal as shown in FIG. 5(g) which lags by ¾ picture element period behind the input signal.

Gates 43 to 46, which are used for selecting a right upward signal, receive at first input terminals a right upward command delivered through the terminal 26A. Those gates receive at the second input terminals signals representing first to fourth scanning lines of the picture elements, which come through terminals 47 to 51. Gates 52 to 55 are used for converting the signal into a right downward signal. Those gates receive at the first input terminals a right downward command transferred through the terminal 31, and a the second input terminals corresponding scanning line signals through terminals 47 to 51.

As shown, the gate 43 receives at the third input terminal the output signal of the flip-flop 38. The gates 44 and 55 receive at the third input terminals the output signal of the flip-flop 42. The gates 45 and 54 receives at the third input terminals the output signal of the flip-flop 39. The gate 52 receives at the third input terminal the signal of the input terminal 17. The output signals of the gates 43 to 46 and 52 to 55 are transferred through an OR gate 56 to the AND gate 32.

The terminal 26A provides a right upward command signal, as shown in FIG. 5(h), which keeps a high level over the two picture elements of period as described referring to FIG. 2. The signals corresponding to four sequential scanning lines are provided at a terminals 47 to 51 at the relevalent time positions. Accordingly, at the time position of the first scanning line, the output signal of the flip-flop 38 is outputted through the gate 43 in response to a high level at a terminal 47, as shown in FIG. 5(j). At the second scanning line time position, the output signal of the flip-flop 42 is outputted through the gate 44 in response to a high level of at a terminal 48 as shown in FIG. 5(k). In the case of the third scanning line, the output signal of the flip-flop 41 is produced through the gate 45 in response to a high level at a terminal 49 as shown in FIG. 5(l). In the case of the fourth scanning line, the output signal of the flip-flop 39 is produced through the gate 46 in response to a high level at a terminal 51 as shown in FIG. 5(m). Those signals are routed to the output terminal 37, through a route of the OR gate 56, the AND gate 32 and the OR gate 36 since the AND gate 32 is opened during this period in response to a high level of the output of the OR gate 25. As seen from the waveforms shown in FIGS. 5(j) to (m), those waveforms cooperate to form a right upward parallelogram picture element as shown in FIG. 3(a).

Figure 3B:
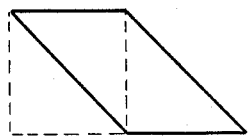

When a right downward command signal as shown in FIG. 5(i) is issued through the terminal 31 for the picture element signals to be processed, the AND gates 52 to 55 are selected in response to a high level at the terminal 31. Accordingly in the case of the first scanning line, a signal from the terminal 17 is directly outputted through the gate 52 in response to a high level at the terminal 47, as shown in FIG. 5(j). In the second scanning line, the output signal of the flip-flop 39 is outputted through the gate 53 in response to a high level at the terminal 48, as shown in FIG. 5(k). In the case of the third scanning line, the output signal of the flip-flop 41 is outputted through the gate 54 in response to a high level at the terminal 49, as shown in FIG. 5(l). In the case of the fourth scanning line, the output signal of the flip-flop 42 is outputted through the gate 55 in response to a high level at the terminal 51, as shown in FIG. 5(m). From this, it will be readily seen that a right downward parallelogram picture element as shown in FIG. 3(b) is obtained.

As shown in FIG. 3(a), when a right upward parallelogram picture element is located continuous to a square picture element 57, a space portion 58 lies on the boundary between them. In order to fill up the space portion 58, a convert command signal delivered from the terminal 25A, for example, is delayed by a delay circuit 59 during one picture element period and the delayed signal is inverted by a inverter 61 and the output signal of the inverter 61 and the command signal from the terminal 25A are applied to a AND gate 62. When a converting picture element signal corresponding to the space 58 is disposed subsequent to a non-converting picture element signal corresponding to the space 57, a high level output signal of 1 bit (one picture element signal period) immediately following the end of the non-converting picture element signal for the space 57 is produced by the gate 62 and enables a gate 63. In this manner, a picture element signal provided at the input terminal 17 is delayed by one bit in the flip-flop 38 and passes through the gate 63 of which the output signal goes through the OR gate 35, the AND gate 34, and the OR gate 36 to the output terminal 37. Therefore so long as the output signal from the gate 32 is absent, the signal from the OR gate 35 fills up the space portion 58 through the gate 34. In a similar manner, A space portion lying between a rectangular picture element and a right downward parallelogram picture element may also be filled up.

For example, when a memory storing a square pattern and a right upward pattern as shown in FIG. 6(a), is read out, the read out signal is converted into a pattern as shown in FIG. 6(b) by identifying an address of the memory as right-upward converting. When a memory stores a right downward pattern as shown in FIG. 6(c), the read out signal from the memory is displayed in the forms of a right downward pattern as shown in FIG. 6(d) by identifying an address of memory as right-downward converting. If those patterns stored two memories are displayed by the display unit 15 with the same origin for the bit patterns shown in FIGS. 6(a) and 6(b), the display patterns shown in FIGS. 6(b) and (d) are combined to form a pattern of a jet plane by synthesizing two bit patterns corresponding to FIGS. 6(a) and 6(b), as shown in FIG. 6(e).

The example mentioned above is an application of the pattern display system according to the invention to a monochrome display apparatus. When it is applied to a color display apparatus, the combination of the character pattern register 14, the slant pattern register 22, and the direction register 24, which is shown in FIG. 2, is provided for each picture element signal from a pattern generator corresponding to red, blue or green, and the output signal from the combined circuit is converted by the picture element converting circuit 18 and then is applied to the corresponding control terminal of red, green or blue for color display apparatus.

Figure 7:
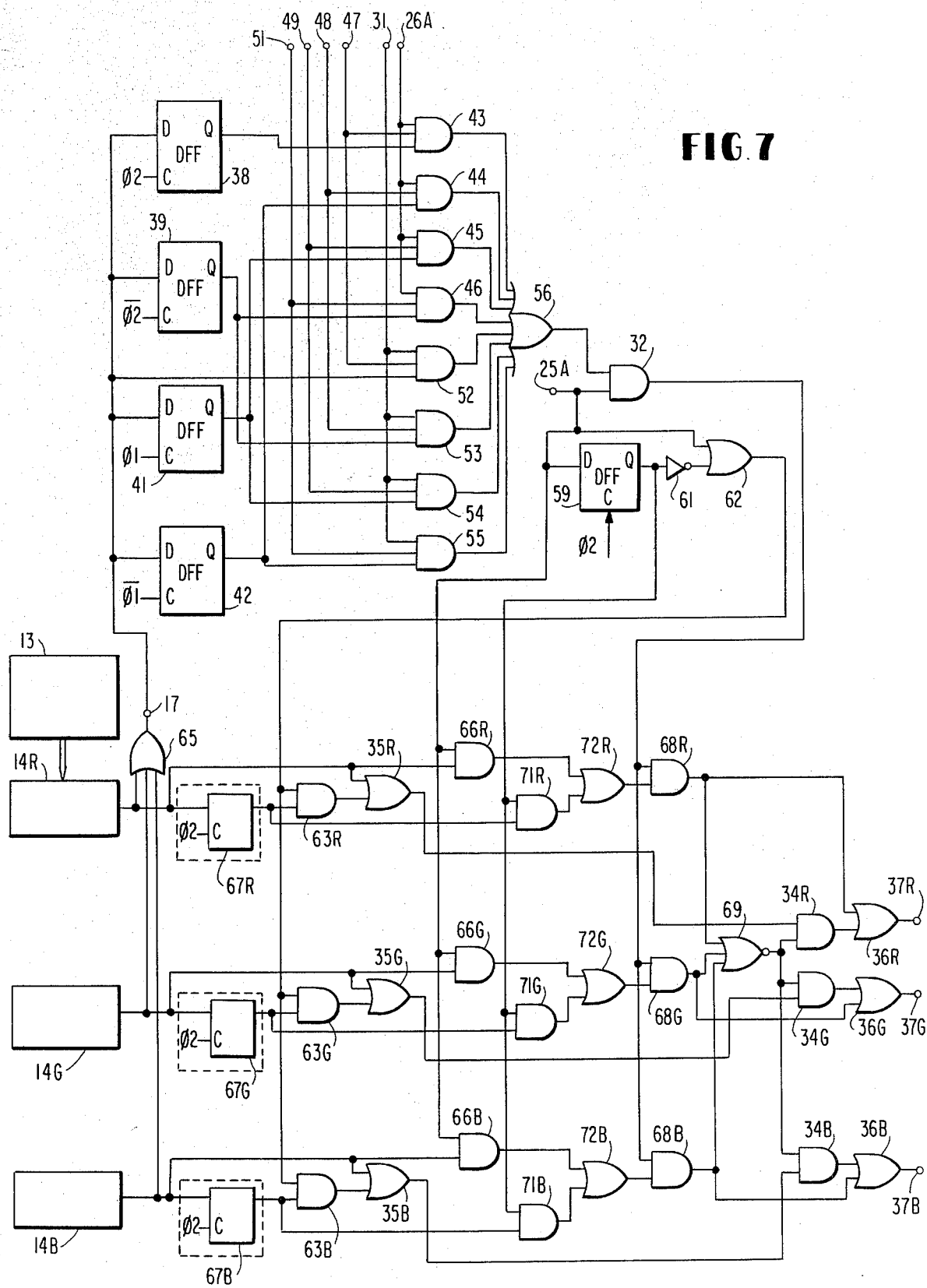
FIG. 7 shows a block diagram of a simplified picture element converting circuit when the pattern display system is applied to a color display system.

In this case, the picture element converting circuit 18 may be provided commonly for the respective colors. For example, in the circuit shown in FIG. 7 in which like portions are designated by like numerals in FIG. 4, the picture element signals corresponding to the respective color signals derived from the pattern generator 13 are loaded into red, green and blue registers 14R, 14G and 14B, respectively. The output signals of those registers are applied through an OR gate 64 to the terminal 17 and also to AND gates 66R, 66G and 66B, and further to delay circuits 67R, 67G and 67B each of one picture element delay.

The output signal from the AND gate 32 is transferred to AND gates 68R, 68G and 66B of which the output signals are transferred through an OR gate 69 to AND gates 34R, 34G and 34B. In a situation where no converting signal is applied to the terminal 25A and the picture elements are of square, the output signal of the AND gate 32 is at low level, and the output signals of AND gates 68R, 68G and 68B are at low level, the output signal of the NOR gate 69 is at high level to open gates 34R, 34G and 34B and the output signals of registers 14R, 14G and 14B are applied to output terminals 37R, 37G and 37B, through the gates 35R, 35G and 35B, gates 34R, 34G and 34B and OR gates 36R, 36G and 36B, respectively. The signals of those output terminals, respectively, are applied to the red, green and blue control terminals of the color display unit. The output signals of picture element delay circuits 67R, 67G and 67G are supplied to AND gates 63R, 63G and 63B and further are applied to AND gates 71R, 71G and 71B, respectively. In a situation where the signal at the terminal 25A is at high level and the pattern to be displayed is a slant pattern, the AND gates 66R, 66G and 66B are open, and the AND gates 71R, 71G and 71G are open after one bit delay given by the delay circuit 59. The output signals of the AND gates 66R and 71R are applied to the OR gate 72R. The output signals of the AND gates 66G and 71G are applied to the OR gate 72G. The output signals of the AND gates 66B and 71B are applied to the OR gate 72B. Therefore, the action of the OR gate 72R makes the output signal of the register 14R have the length of two picture elements of period. Similarly, the actions of the OR gates 72G and 72B make the output signals of the registers 14G and 14B have the length of two picture element periods, respectively. The respective signals with two picture elements of period are applied to the AND gates 68R, 68G and 68B. At this time, those gates have been supplied with the output signals of the AND gate 32, so that the output signals of the AND gates 68R, 68G and 68B are supplied to the OR gates 36R, 36G and 36B, respectively. Accordingly, in the case of the conversion to the slant signal, if the right upward or right downward command signals are applied to the terminals 26A and 31, the gates 68R, 68G and 68B are enabled, and red, green and blue picture element signals have been applied to those gates, as described referring to FIG. 4. Accordingly, the output signals of the gates 68R, 68G and 68B are supplied to the output terminals 37R, 37G and 37B, through the OR gates 36R, 36G and 36B. In this manner, the color display may be controlled. In order for filling up a spaced portion between a square picture element and a parallelogram picture element, the output signal of the AND gate 62 is applied to the AND gates 63R, 63G and 63B of which the output signals are in turn applied to the OR gates 35R, 35G and 35B, respectively.

As described above, in the invention, the picture elements at the slant portion of a pattern to be displayed are converted into parallelogram picture elements along the slanting line. For this, a pattern displayed is fairly similar to a real pattern, without increasing the number of picture elements and the memory capacity and without speeding up the transfer speed of a pattern signal.

What is claimed is:

1. A pattern display system comprising: first memory means for storing pattern information representing a plurality of rectangular picture elements of a pattern to be displayed; second memory means for storing conversion information; means for generating timing signals; display means which operate in synchronism with the timing signals; means for deriving a display signal representing said rectangular picture elements from said first memory means in synchronism with the timing signals, each of said rectangular picture elements being displayed over plural units of continuous display areas of said display means, each unit of said display areas being energized in response to each of the timing signals applied to said display means; means for deriving a conversion signal from said second memory means in synchronism with the timing signals; a plurality of digital delay means operatively storing the display signal corresponding to one of said rectangular picture elements and generating delayed signals with different phases from each other over the period that said plural units of continuous display areas are energized, first means responsive to said conversion signal for sequentially deriving said delayed signals in a first order so as to represent a first approximated parallelogram picture element; and second means responsive to said conversion signal for sequentially deriving said delayed signals in a second order, the reverse of said first order, so as to represent a second approximated parallelogram picture element having a different slope from said first approximated parallelogram picture element.

2. A pattern display system in which a pattern is decomposed into a plurality of rectangular picture elements, picture element signals representing the decomposed picture elements are generated from a pattern generator in synchronism with a scanning type display unit, and the picture element signals are applied to the scanning type display unit thereby to display the pattern thereat, comprising memory means for storing a slant portion of the pattern, a plurality of digital memory means for operatively storing the same picture element signals and generating different phases of delayed signals during the time period for displaying each of said picture element signals on said display unit, and means responsive to the output of said memory means for selectively supplying said display unit with said delayed signals, thereby to display approximated parallelogram picture elements with such slopes as to run along the slant line of the slant portion.

3. A pattern display apparatus comprising a plurality of read-only memory locations, each of said memory locations storing a pattern composed of a rectangular picture element, a scanning type display unit, means for generating picture element signals displaying the pattern of a selected memory location on said display unit, a plurality of digital delay means storing each of the generated picture element signals, each of said digital delay means producing a delayed signal of said stored picture element signal with a different delay time from each other within the time period required for scanning one of said picture element signals, means for storing information in memory locations to be subjected to a parallelogram conversion among said plurality of memory locations, and means responsive to said storing means for selectively deriving said delayed signals so as to synthesize a plurality of sequentially delayed signals which display an approximated parallelogram picture element on said display unit.

4. The system according to claim 1, wherein second memory means includes read-only memories.

5. A pattern display apparatus comprising memory means for storing pattern information representing a plurality of rectangular picture elements of a pattern to be displayed, a display unit, a decoder circuit receiving a signal derived from said memory means for selectively producing a rectangular element signal representing said rectangular picture element and a slant signal substantially at the same time, a plurality of digital memory means operatively storing the produced rectangular element signal and producing delayed signals with different phases from each other and means responsive to said slant signal for selectively deriving said delayed signals so as to change them into a plurality of sequentially delayed signals which display an approximated parallelogram picture element on said display unit.

6. The apparatus according to claim 5, further comprising a first shift register for storing the signal derived from said memory means and transferring the stored signal to said decoder circuit.

7. The apparatus according to claim 6, further comprising a timing signal generator for producing a chain of timing signals which are used to control said display unit and said decoder circuit.

8. The apparatus according to claim 7, further comprising a second shift register for storing said rectangular element signal and a third shift register for storing said slant signal.

9. The apparatus according to claim 5, wherein said deriving means includes a plurality of AND gate means, each of which receives one of said delayed signals for delaying associated ones of said rectangular element signals.

10. The apparatus according to claim 9, wherein said digital memory means includes a D-type flip-flop.

* * * * *

UNITED STATES PATENT AND TRADEMARK OFFICE
CERTIFICATE OF CORRECTION

PATENT NO. : 4,318,097
DATED : March 2, 1982
INVENTOR(S) : Toshio Oura

It is certified that error appears in the above—identified patent and that said Letters Patent is hereby corrected as shown below:

Column 1, line 45, correct the spelling of "recognizing".

Column 3, line 59, after "not," insert --and--.

Column 4, line 11, after "Through" insert --delay--.

Column 5, line 15, change "a" to --at--.

Column 5, line 31, delete "a".

Column 5, line 32, correct the spelling of "relevant".

Column 6, line 30, change "A" to --a--.

Column 7, line 23, change "67G (second occurrence) to --67B--.

Column 7, line 29, change "71G" to --71B--.

Signed and Sealed this

First Day of June 1982

[SEAL]

Attest:

GERALD J. MOSSINGHOFF

Attesting Officer    Commissioner of Patents and Trademarks